(12) United States Patent
Sato et al.

(10) Patent No.: US 7,785,682 B2
(45) Date of Patent: Aug. 31, 2010

(54) MULTILAYER SHEET MADE OF POLYGLYCOLIC ACID RESIN

(75) Inventors: Takashi Sato, Tsuchiura (JP); Kazuyuki Yamane, Iwaki (JP); Juichi Wakabayashi, Ishioka (JP); Tomoaki Sato, Ishioka (JP); Takehisa Suzuki, Matsudo (JP)

(73) Assignee: Kureha Corporation, Tokyo (JP)

( * ) Notice: Subject to any disclaimer, the term of this patent is extended or adjusted under 35 U.S.C. 154(b) by 791 days.

(21) Appl. No.: 11/630,255

(22) PCT Filed: Jun. 20, 2005

(86) PCT No.: PCT/JP2005/011261

§ 371 (c)(1),
(2), (4) Date: Feb. 12, 2007

(87) PCT Pub. No.: WO2006/001250

PCT Pub. Date: Jan. 5, 2006

(65) Prior Publication Data

US 2008/0069988 A1  Mar. 20, 2008

(30) Foreign Application Priority Data

Jun. 25, 2004  (JP) .............................. 2004-188576

(51) Int. Cl.
*B27M 3/00* (2006.01)
*B27N 5/02* (2006.01)

(52) U.S. Cl. ...................... 428/35.6; 428/34.2; 428/35.7

(58) Field of Classification Search ................ 428/35.6, 428/34.2, 35.7; 528/354, 425; 525/419, 525/420; 521/79

See application file for complete search history.

(56) References Cited

FOREIGN PATENT DOCUMENTS

| JP | 10-006444 | 6/1996 |
| JP | 2003-266527 | 3/2002 |

OTHER PUBLICATIONS

International Search Report for PCT/JP2005/011261, dated Oct. 11, 2005.

*Primary Examiner*—Michael C Miggins
(74) *Attorney, Agent, or Firm*—Reed Smith LLP

(57) ABSTRACT

A polyglycolic acid resin-based multilayer sheet, comprising: a plant substrate sheet and a biodegradable resin layer laminated by melt-adhesion onto the plant substrate sheet, wherein said biodegradable resin layer comprises one or plural layer including at least a polyglycolic acid resin layer, and the multilayer sheet includes on the substrate sheet a melt-adhesion layer comprising a biodegradable resin exhibiting a melt viscosity of $10\text{-}5.0\times10^3$ Pa·sec as measured at a temperature of 240° C. and a shear speed of 122 $\sec^{-1}$ and having a melting point of at most 235° C. The multilayer sheet has a laminate structure composed of biodegradable materials exerting little load to the environment at the time of disposable thereof and yet is excellent in oxygen-barrier property and moisture resistance, thus being suitable as a food container-forming material.

9 Claims, No Drawings

MULTILAYER SHEET MADE OF POLYGLYCOLIC ACID RESIN

TECHNICAL FIELD

The present invention relates to a paper-like multilayer sheet suitable for use as a material for cups used for food and beverages, such as coffee, soup, Miso-soup and snack candies, or a material for trays used for pizza, daily dishes, foods for microwave oven, etc.

BACKGROUND ART

Multilayer sheets formed by laminating a synthetic resin onto substrate materials, such as paper and cloth (Herein, these substrate (materials) including paper and materials having like properties are inclusively referred to as "paper-like substrates" or "plant substrate sheets"), are used for various purposes.

For example, paper-made containers, such as paper cups and paper trays, used for food and beverages have been formed by laminating a polyolefin composition as a water-repellent or an oil-repellent layer onto at least one side of a paper-like substrate containing contents, such as liquids or oily food.

In conventional processes for producing materials for paper-made containers, such as paper cups or paper trays, the lamination has to be performed at high temperatures of 300° C. or higher in order to ensure close contact and adhesion of the polyolefin composition as a water-repellent or an oil-repellent layer with paper. Accordingly, the polyolefin is degraded by oxidation to result in residual odor due to the oxidation degradation of the resin composition in the paper laminate, and generation of smoke in a large quantity in the lamination step, leading to problems, such as deterioration of the operation environment and pollution of the surrounding environment.

The paper cups, paper trays, etc., after the use cannot be decomposed even embedded in the earth to pollute the environment because of the lamination of polyolefin composition lacking degradability with microorganisms or hydrolyzability. Accordingly, a composition for a water-repellent layer or an oil-repellent layer capable of biological degradation along with paper has been intensely demanded.

For complying with such demands, various proposals have been made regarding food containers which comprise a multilayer sheet obtained by forming a various biodegradable resin layer on a paper-like substrate and result in little load to the environment at the time of disposal thereof (e.g., Patent documents 1-4 shown below).

On the other hand, food containers are required to show a function of preventing degradation of food contents during storage thereof due to permeation of oxygen or moisture. For imparting the property to paper-based food containers, it has been proposed to dispose a barrier layer of special polymethallyl alcohol on a paper-like substrate (Patent document 5 shown below), but in this case, the product is not likely to be a biodegradable container.

Patent document 1: JP-A 4-336246,
Patent document 2: JP-A 6-171050,
Patent document 3: JP-A 6-316042,
Patent document 4: JP-A 2003-261129,
Patent document 5: JP-A 11-91016,

DISCLOSURE OF INVENTION

Accordingly, a principal object of the present invention is to provide a multilayer sheet with biodegradability and good barrier property by laminating a biodegradable resin layer onto a paper-like substrate.

The present inventors proceeding with application and development of polyglycolic acid resin had arrived, from some earlier time, at a concept that it would be effective to laminate a polyglycolic acid resin layer having excellent barrier property onto a paper-like substrate in order to accomplish the above-mentioned object. However, polyglycolic acid resin is a high-melting point resin having a melting point of at least 200° C., which leads to a problem that the hot lamination of the resin onto a paper-like substrate is difficult. Nevertheless, the formation of an adhesive layer by application using an organic solvent as taught by Patent document 3 or 4 above, on the other hand, leaves a problem of residual solvent and is not desirable for provision of a food container-forming material.

As a result of study with the above-mentioned object, the present inventors have found it possible to obtain a multilayer sheet which is excellent in biodegradability and barrier property, also free from the problem of residual solvent, by using polyglycolic acid resin per se as a melt-adhesion layer through provision thereto of appropriate melting properties or by using a melt-adhesion layer of another biodegradable resin having appropriate melting properties to laminate a polyglycolic acid resin layer onto a paper-like substrate, particularly a plant substrate sheet, thus arriving at the present invention.

More specifically, the polyglycolic acid resin-based multilayer sheet according to the present invention, comprises: a plant substrate sheet and a biodegradable resin layer laminated by melt-adhesion onto the plant substrate sheet, wherein said biodegradable resin layer comprises one or plural layers including at least a polyglycolic acid resin layer, and the multilayer sheet includes on the substrate sheet a melt-adhesion layer comprising a biodegradable resin exhibiting a melt viscosity of $10\text{-}5.0 \times 10^3$ Pa·sec as measured at a temperature of 240° C. and a shear rate of 122 $sec^{-1}$ and having a melting point of at most 235° C.

BEST MODE FOR PRACTICING THE INVENTION

Hereinbelow, the present invention will be described more specifically with reference to preferred embodiments thereof.
(Plant Substrate Sheet)
The polyglycolic acid resin-based multilayer sheet according to the present invention is formed from a plant substrate sheet which is similar to the above-mentioned paper-like substrate. Preferred examples thereof may include: so-called paper formed of entangled plant fiber and, in addition thereto, sheets formed of natural polymers of plant origin or derivatives thereof (and further of polymers of animal origin, such as animal starch, having a similar chemical structure as natural polymers of plant origin or derivatives thereof; these may be inclusively referred to as biological polymers), and also pulp-mold sheet formed by binding pulp with a binder of such resin.

More specifically, examples of so-called paper may include: Japanese paper, plain paper, kraft paper, art paper, coated paper, Indian paper, paper board, corrugated paper board, cup paper, and ivory paper, and any of these can be used. In view of the use as a food container-forming material, it is preferred to use paper having a basis weight of 5-500 $g/m^2$, particularly 20-300 $g/m^2$.

The natural polymers of plant origin can further include: celluloses, such as cellulose and hemicellulose, abundantly contained in timber or lumber, wood and grass; various starches formed of amylose and amylopectin combined with each other in various proportions, other polysaccharides; lignins; and chemically modified derivatives of polysaccharides and lignins, such as cellulose acetate. Further, animal starches such as glycogen, and animal polysaccharides inclusive of chitins such as chitin and chitosan, can also be used singly or in combination with a natural polymer of plant origin. Sheet products of such natural polymers may include a starch resin sheet as a representative example and also a commercially available product such as a sheet-form product of chitosan-derivative resin ("DOLON CC", made by Aicello Kagaku K.K.).

Such a sheet product of natural polymer resin can be used singly as a plant substrate sheet in the present invention and also in the form of a plant substrate sheet laminated with paper as described above.

A surface to be laminated with a biodegradable resin of such a plant substrate sheet can be subjected to a pre-treatment for improving adhesiveness, such as a corona discharge treatment or application of a primer, but the primer application using an organic solvent should be avoided.

(Biodegradable Resin)

Herein, a "biodegradable resin" refers to a resin which is decomposed to low-molecular weight compounds, such as carbon dioxide gas, methane and water, by hydrolysis or function of microorganisms in a natural environment such as soil and water or a biodegradable polymer material having a molecular weight (Mn) of at least 1,000 belonging to "PL Class A" prescribed by Foundation: Biodegradable Plastic Association, Japan. Briefly speaking, it may be defined as a resin which has a biodegradability comparable to or even higher than that of paper. In the present invention, polyglycolic acid resin is used as an essential biodegradable resin, and also another biodegradable resin can be used additionally according to necessity.

(Polyglycolic Acid Resin)

The polyglycolic acid resin (hereinafter sometimes referred to as "PGA resin") used in the present invention includes homopolymer of glycolic acid (including a ring-opening polymerization product of glycolide (GL) that is a bimolecular cyclic ester of glycolic acid) consisting only of glycolic acid recurring unit represented by a formula of: —(—O—CH$_2$—CO—)— (1), and also a glycolic acid copolymer containing at least 55 wt. % of the above-mentioned glycolic acid recurring unit.

Examples of comonomer providing polyglycolic acid copolymer together with a glycolic acid monomer, such as the above-mentioned glycolide, may include: cyclic monomers, such as ethylene oxalate (i.e., 1,4-dioxane-2,3-dione), lactides, lactones (e.g., β-propiolactone, β-butyrolactone, pivalolactone, γ-butyrolactone, δ-valerolactone, β-methyl-δ-valerolactone, and ε-caprolactone), carbonates (e.g., trimethylene carbonate), ethers (e.g., 1,3-dioxane), either esters (e.g., dioxanone), amides (ε-caprolactam); hydroxycarboxylic acids, such as lactic acid, 3-hydroxypropanoic acid, 3-hydroxybutanoic acid, 4-hydroxybutanoic acid and 6-hydroxycaproic acid, and alkyl esters thereof; substantially equi-molar mixtures of aliphatic diols, such as ethylene glycol and 1,4-butanediol, with aliphatic dicarboxylic acids, such as succinic acid and adipic acid, or alkyl esters thereof; and combinations of two or more species of the above.

The content of the above glycolic acid recurring unit in the PGA resin is at least 55 wt. %, preferably at least 70 wt. %, more preferably at least 90 wt. %. If the content is too small, it becomes difficult to attain a gas barrier property-improving effect expected of the PGA resin. Within this extent, the PGA resin may comprise 2 or more species of polyglycolic acid (co-)polymers.

The PGA resin may preferably have a weight-average molecular weight (based on polymethyl methacrylate) in a range of 50,000-800,000 according to GPC measurement using hexafluoroisopropanol solvent. If the weight-average molecular weight is too low, the resultant shaped product is caused to have a lower strength. Too large a weight-average molecular weight results in difficulties, such as heat evolution due to shearing force exerted by a screw during the melt-processing for processing of the PGA resin into pellets or formation into a shaped product, thus leading to coloring of the resin, and products with poor appearance, such as irregularity (flow mark) due to insufficient melting. The weight-average molecular weight is more preferably on the order of 150,000-300,000.

(Another Biodegradable Resin)

In the present invention, it is also possible to use another biodegradable resin in addition to the above-mentioned polyglycolic acid resin. Examples of such another biodegradable resin may include: homopolymers or copolymers of the above-mentioned comonomers forming polyglycolic acid copolymers together with glycolic acid monomer. In addition, it is also possible to use polyamino acids and polyesteramides including proteins, such as gluten and collagen; polyethers, such as polyalkylene glycols; polyester saponification products, such as polyvinyl alcohol. Many of these are aliphatic resins, but it is also possible to use copolymers containing an aromatic component within an extent of not losing biodegradability as a whole. Examples thereof may include: biodegradable aromatic polyester resins which have been provided with biodegradability by replacing a portion of aromatic dicarboxylic acids constituting aromatic polyester resins with aliphatic dicarboxylic acids, such as succinic acid and adipic acid. Commercially available examples thereof may include: polyethylene terephthalate-succinate copolymer ("BIOMAX", made by Dupont Co.), polybutylene adipate-terephthalate ("ECOFLEX", made by BASF Japan K.K.), and polytetramethylene adipate-co-terephthalate ("ESTER BIO", made by Eastman Chemical Japan K.K.), which are preferably used in the present invention. In addition to the above, many biodegradable resins are commercially available, and examples thereof are enumerated below in terms of common name ("trader product (series) name", maker)

Polylactic acid ("NATURE WORKS" made by Cargill-Dow Co., "LACTY" made by K.K. Shimadzu Seisakusho, "LACTRON" made by Kanebo Gousen Co. "BIRO ECOL" made by Toyo Boseki K.K., "TOYOTA ECOPLASTIC U'z" made by Toyota Jidosha K.K., all having glass transition points (Tg)=50-60° C., and melting points (Tm)=150-180° C.), polylactic acid/diol dicarboxylic acid copolymer ("PLA-MATE PD" made by Dainippon Ink Kagaku Kogyo K.K.), polycaprolactone ("CELLGREEN" made by Daicel Kagaku Kogyo K.K., "TONE POLYMER" made by Dow Chemical Co.; Tg=ca. –60° C. Tm=ca. 60° C.), poly-3-hydroxybutyric acid ("BIOGREEN" made by Mitsubishi Gas Kagaku K.K.; Tg=ca. 5° C., Tm=ca. 180° C.), poly-3-hydroxybutylate—co-3-hydroxyhexanoate ("PHBH" made by Kanegahuchi Kagaku Kogyo K.K.), polybutylene succinate ("BIONOLE" made by Showa Kobunshi K.K.; Tm=ca. 115° C.), polybutylene succinate-adipate ("BIONOLE" made by Showa Kobunshi K.K.), poly (ε-caprolactone-butylene succinate) ("CELLGREEN CBS" made by Daicel Kagaku Kogyo K.K.; Tm=47-72° C.), polyethylene succinate ("LUNALE SE"

made by Nippon Shokubai K.K.; Tm=ca. 100° C.), polyester carbonate ("UPEC" made by Mitsubishi Gas Kagaku K.K.; Tm=ca. 105° C.), polybutylene adipate-terephthalate ("ECOFLEX" made by BASF Japan K.K.; Tm=105-115° C.), polyethylene terephthalate-co-succinate ("GREEN ECOPET" made by Teijin K.K.), polytetramethylene adipate-co-terephthalate ("EASTER BIO" made by Eastman Chemical Japan K.K.; Tg=−30° C., Tm=ca. 110° C.), polybutylene succinate-co-adipate ("ENPOL" made by Ire Chemical Co.), polyethylene terephthalate-succinate copolymer ("BIOMAX" made by Dupont Co.; Tg=27-44° C., Tm=195-200° C.), (1,4-butadiene succinate-adipate-lactate) copolymer ("GS PLA" made by Mitsubishi Kagaku K.K.; Tm=ca. 90° C.), polyvinyl alcohol ("GOSENOL", "GOSENAL" and "ECOTY" made by Nippon Gosei Kagaku Kogyo K.K.; "KURARAY POVAL" and "KURARAY SEVAL" made by Kuraray K.K.), β-hydroxylactate-β-hydroxyvalerate copolymer ("BIOPOL" made by Monsanto Co.; Tm=135-150° C.), starch aliphatic acid ester ("CONEPOL CP" made by Nippon Cone Starch K.K.), starch polyester ("MATER BI" made by Novamont Co.), cellulose acetate ("CELLGREEN CA-BNE" made by Daicel Kagaku Kogyo K.K., "ACETATE CELLULOSE" made by Teijin K.K.), and chitosan ("DOLON CC" made by Aicello Kagaku K.K.).

From these biodegradable resins, one or two or more species thereof may be selected as desired after considering their melt-viscosity characteristic, etc., for formation of a melt-adhesion layer as described hereinafter.

(Polyglycolic Acid Resin Layer)

The polyglycolic acid resin layer as an essential component of the multilayer sheet according to the present invention is preferably composed of the above-mentioned polyglycolic acid resin alone but can be composed of a mixture with another biodegradable resin or another thermoplastic resin (within an extent of retaining biodegradability as a whole) within an extent of ensuring the above-mentioned glycolic acid recurring unit content of at least 55 wt. %, preferably at least 70 wt. %, more preferably at least 90 wt. %. The gas-barrier property tends to be lowered as the glycolic acid recurring unit content is lowered, so that the above-mentioned content range should be satisfied.

The melt-adhesion layer functioning as a hot melt-adhesion layer between a plant substrate sheet and a biodegradable resin layer is formed of the above-mentioned polyglycolic acid resin layer or another biodegradable resin layer. Preferred examples of such another biodegradable resin include the above-mentioned biodegradable aromatic polyester resin. In any case, the resin forming the melt-adhesion layer is required to have a melting point of at most 235° C. and a melt viscosity of $10$-$5.0 \times 10^3$ Pa·sec as measured at a temperature of 240° C. and a shear rate of 122 sec$^{-1}$.

In case where the melt-adhesion layer-forming resin has a melting point exceeding 235° C. or a melt viscosity exceeding $5.0 \times 10^3$ Pa·sec., it becomes difficult to attain a necessary adhesion strength through hot melt adhesion of the biodegradable resin layer without causing thermal deterioration of the polyglycolic acid resin layer. On the other hand, at a melt viscosity less than 10 Pa·sec, it becomes also difficult to attain a necessary adhesion strength through hot melt-adhesion due to too low a cohesive force.

In the case where another biodegradable resin than polyglycolic acid resin is used, such another biodegradable resin need not be a crystalline resin, and for such a non-crystalline resin, it is appropriate to use a temperature of glass transition temperature (Tg)+150° C. for a melting point (Tm) of the resin for the present invention. However, the lower limit of Tm should be determined from the viewpoint of not causing deformation or delamination when contacted with hot water in view of the use as a multilayer sheet for food container-forming material, and it is suitable that Tm is at least 80° C. As for Tg, even a lower temperature is free from such a problem.

(Layer Structure)

The multilayer sheet of the present invention includes a plant substrate sheet and a polyglycolic acid resin layer as essential components, and also another biodegradable resin layer as an optional layer component, but the layer structure thereof can be versatile. For example, if a plant substrate sheet is denoted by P, a polyglycolic acid resin layer is denoted by G and another biodegradable resin is denoted by B, representative layer structures thereof may include: P/G, P/G/B, P/B/G, P/B/G/B, etc. More specifically, examples of the P/B/G laminate structure may include: paper/PLLA (crystalline poly-L-lactic acid)/G, paper/PLA (amorphous polylactic acid including D-isomer)/G, paper/biodegradable aromatic polyester/G, and paper/aliphatic polyester/G; and examples of the P/B/G/B laminate structure may include: paper/PLLA/G/PLLA, paper/PLLA/G/PLA, paper/PLLA/G/biodegradable aromatic polyester, paper/PLLA/G/aliphatic polyester, paper/PLA/G/biodegradable aromatic polyester, paper/PLA/G/aliphatic polyester, paper/biodegradable aromatic polyester/G/PLLA, paper/biodegradable aromatic polyester/G/PLA, paper/biodegradable aromatic polyester/G/biodegradable aromatic polyester, paper/biodegradable aromatic polyester/G/aliphatic polyester, etc.

The above laminate structure may be formed by melt-adhesion lamination of a single layer or laminate layers of biodegradable resin onto a plant substrate sheet by way of melt-extrusion lamination or heat-pressure bonding. A multilayer sheet of a high strength can be formed by obtaining a film of a single layer or laminate layers of biodegradable resin through melt-processing as by T-die extrusion or inflation forming, or a stretched film through melt-processing, cooling, re-heating and uniaxial or biaxial stretching prior to the melt-adhesion lamination by way of the heat-pressure bonding, and laminating the film onto the plant substrate sheet by heat-pressure bonding. In this instance, if the stretched film is heat-treated under tension to reduce its heat-shrinkability (measured after immersion in hot water at 90° C. for 5 sec.) down to preferably at most 10%, more preferably 5% or below, the deformability of the resultant multilayer sheet formed, e.g., as a food container used under a high-temperature condition, can be reduced. Such a stretched film can exhibit a heat shrinkability exceeding 10% and reaching 50% sometime, if heat-treatment under tension is not effected.

It is possible to provide the above-mentioned layer structure with a further G or B layer without any harm. For example, the addition onto outside the plant substrate sheet of a biodegradable resin layer (e.g. B) of identical species as a biodegradable resin layer (B) on the opposite side is effective for formation of a pouch by back-seaming (i.e., bonding of two surfaces of a packaging sheet to each other), it is possible to provide a preferable layer structure by inserting a thin layer (at, e.g., 2-100 μm) of an aliphatic polyester resin having an appropriate crystallization temperature of 120-190° C., preferably 130-170° C. (e.g., PGA having a crystallization temperature of ca. 160° C. typically being a suitable example thereof) outside the G layer or B layer functioning as a melt-adhesion layer (i.e., as an outermost layer directly contacting P of the biodegradable resin layer) so as to control the penetration of the melt-adhesion layer resin to the paper-like substrate at the time of melt-adhesion, thereby improving the thickness and adhesion strength of the biodegradable resin layers. Further, it also possible to add a printing layer, an adhesive resin layer, etc., as desired, within an extent of not impairing the biodegradability of the multilayer sheet as a whole.

In order to ensure gas-barrier property and water vapor-barrier property desired of a food container, the polyglycolic acid resin layer is preferably contained in a thickness of at least 2 µm, particularly in a range of 2-100 µm. Further, the biodegradable resin layer(s) including the polyglycolic acid resin layer and another biodegradable resin layer may preferably have a total thickness in a range of 2-3,000 µm, particularly 2-1,000 µm.

(Hot Melt-Adhesion Treatment)

The multilayer sheet of the present invention having a layer structure as described above is obtained by laminating the above-mentioned biodegradable resin layer(s) including the polyglycolic acid resin layer onto the plant substrate sheet by hot melt-adhesion. The hot melt-adhesion can be accomplished by (co-)extrusion lamination or hot pressure bonding of the biodegradable resin layer(s). The resin temperature of the biodegradable resin layer(s) at the time of the extrusion lamination is appropriately on the order of 250-300° C. Below 250° C., the hot melt-adhesion of polyglycolic acid resin is insufficient and, in excess of 300° C., the heat deterioration of polyglycolic acid resin cannot be ignorable. On the other hand, at the time of the hot pressure bonding, it is appropriate that the melt-adhesion layer resin temperature is in the range of Tm+20° C. to 300° C., and the pressure is on the order of 0.2-1.0 MPa.

The thus-formed multilayer sheet of the present invention is preferably used as a food container-forming material for an oily food or beverages, etc., for which degradation by oxidation should be avoided, or dry food which is likely to denaturate by moisture adsorption, since the polyglycolic acid resin layer contained therein has excellent gas-barrier property (at least 3 times that of EVOH, which is a typical gas-barrier resin) and excellent water vapor-barrier property.

EXAMPLES

Hereinbelow, the present invention will be described more specifically based on Examples and Comparative Examples. Physical properties described in the description including Examples below are based on measured values according to the following method.

(1) Melt Viscosity

Melt viscosity values at a temperature of 240° C. and a shear rate of 122 sec$^{-1}$ were measured by using "Capillograph ID PMD-C" (made by K.K. Toyo Seiki).

Melting Point and Crystallization Temperature.

A differential scanning calorimeter ("DSC-60, made by K.K. Shimadzu Seisakusho) was used for heating at a temperature-raising rate of 20° C./min. from room temperature to 250° C. to determine an endothermic peak temperature appearing in this course as a melting point and, after holding at 250° C. for 1 min., for cooling at a temperature-lowering rate of 20° C./min. down to room temperature to determine an exothermic peak temperature appearing in this course as a crystallization temperature.

Peeling Strength (Adhesive Strength)

Each sample was subject to a T-peeling test between paper and the biodegradable resin layer(s) to determine a peeling strength per width of 15 mm (N/15 mm).

Oxygen Permeation Constant

An oxygen permeability meter ("MOCON OX-TRAN 2/20" made by Modern Control Co.) was used to measure an oxygen permeation constant per thickness of polyglycolic acid resin layer under the conditions of 23° C. and 80%-relative humidity according to JIS K7126 (constant-pressure method), (However, for Comparative Example 2 described hereinbelow, an oxygen permeation constant per thickness of PET·S layer is indicated.)

(5) Moisture Permeability

A water vapor permeability (g/m$^2$·day) was measured with respect to a sample sheet under the conditions of 40° C. and 90%-relative humidity according to JIS K7129 to indicate a value per a total thickness of the resin layers normalized at 20 µm (g·20 µm/m$^2$·day).

Example 1

Melt Extrusion Lamination

Three extruders (having screw diameters of 50 mm, 60 mm and 50 mm, respectively; and all having an L/D ratio of 24) and a feed block-type T-die for providing a laminate of three layers of three resins were used to extrude a transparent multilayer sheet of three-layer structure (PET·S/PGA/PET·S in thicknesses of 40/40/40 µm, respectively, from the left) including a second layer (central layer) of polyglycolic acid (abbreviated as "PGA") having a melt viscosity of 9.0×10$^2$ Pa·sec and a melting point of 220° C. and first and third layers on both sides thereof of polyethylene terephthalate-succinate copolymer ("BIOMAX" made by Dupont Co.; abbreviated as "PET·S") under the conditions of a resin temperature of 260° C. and a sheet take-up roller speed of 4.0 m/min onto a 200 µm-thick un-processed cup stock-paper (basis weight of 250 g/m$^2$) supplied at an identical speed of 4.0 m/min. so that the first or third layer of PET·S faced the paper, followed by lamination through pinch rollers (exerting a roller pressure of 0.6 MPa) to form a biodegradable multilayer sheet with a layer structure of paper/PET·S/PGA/PET·S.

Example 2

Extrusion Melt Lamination

An extruder (having a screw diameter of 60 mm; L/D=24) and a feed block-type T-die were used to extrude PGA (melt viscosity=9.0×10$^2$ Pa·sec., melting point=220° C.) identical to the one used in Example 1 in a thickness of 100 µm under the conditions of a resin temperature of 280° C. and a sheet take-up roller speed of 4.0 m/min. onto a 200 µm-thick un-processed cup stock paper (basis weight: 250 g/m$^2$) supplied at an identical speed of 4.0 m/min., followed by lamination through pinch rollers (exerting a roller pressure of 0.6 MPa) to form a biodegradable multilayer sheet with a layer structure of paper/PGA.

Example 3

Heat-Pressure Bonding

A transparent multilayer sheet of three layer structure of PET·S/PGA/PET·S (in thicknesses of 40/40/40 µm, respectively, from the left) prepared under the same conditions as in Example 1 by using the PGA and PET·S used in Example 1 was fed together with a 200 µm-thick un-processed cup stock-paper (basis weight: 250 g/m²) facing the PET·S side of the multilayer sheet between a heating roller and a guide roller of hot lamination rollers (made by K.K. Robot Kogyo; heating roller diameter=300 mm, guide roller diameter=100 mm) to effect lamination by hot-pressure bonding under the conditions of a temperature of 240° C., a roller pressure of 0.6 MPa and a lamination speed of 1.0 m/min. to form a biodegradable multilayer sheet with a layer structure of paper/PET·S/PGA/PET·S.

Comparative Example 1

Extrusion Melt Lamination

PGA (melt viscosity=7.0×10³ Pa·sec, melting point=220° C.) was melt-extruded in a thickness of 100 μm and laminated onto a ca. 200 μm-thick un-processed up stock-paper (basis weight: 250 g/m²) under the same conditions as in Example 2 to form a biodegradable multilayer sheet with a two-layer structure of paper/PGA.

Comparative Example 2

Extrusion Melt Lamination

An extruder (having a screw diameter of 60 mm; LD=24) and a feed block-type T-die were used to extrude PET·S (melt viscosity=2.8×10² Pa·sec., melting point=197° C.) in a thickness of 100 μm under the conditions of a resin temperature of 260° C. and a sheet take-up roller speed of 4.0 m/min. onto a 200 μm-thick un-processed cup stock paper (basis weight of 250 g/m²) supplied at an identical speed of 4.0 m/min., followed by lamination through pinch rollers (exerting a roller pressure of 0.6 MPa) to form a biodegradable multilayer sheet with a layer structure of paper/PET·S.

The multilayer sheet obtained in the above-described manners in Examples and Comparative Examples were subjected to measurement of peeling strength, oxygen permeation constant and moisture permeability according to the above-described methods. The results are inclusively shown in Table 1 below together with the melt viscosity of the melt-adhesion layer resin.

TABLE 1

| Example | Melt viscosity of melt-adhesion layer (Pa · sec@240° C. · 122 sec-1) | Peeling strength (N/15 mm) | Oxygen permeation constant × 10⁻⁴ (cm³ · cm/cm² · sec · cmHg) | Moisture permeability (g · 20 μm/ m² · day) |
|---|---|---|---|---|
| 1 | 2.8 × 10² | 2.0 | 4.5 | 15 |
| 2 | 9.0 × 10² | 1.0 | 5.0 | 20 |
| 3 | 2.8 × 10² | 2.2 | 4.5 | 15 |
| Comp. 1 | 7.0 × 10³ | 0.1 | — | — |
| Comp. 2 | 2.8 × 10² | 2.8 | 305 | 250 |

INDUSTRIAL APPLICABILITY

As is understood from Table 1 above, the polyglycolic acid resin-based multilayer sheet of the present invention (Example 1-3) formed by hot melt-adhesion lamination of wholly biodegradable resin(s) onto a paper substrate exhibited very excellent oxygen-barrier property and moisture resistance due to the use of a polyglycolic acid resin layer and also retained a good peeling strength through appropriate control of the melt viscosity of the melt-adhesion layer. Accordingly, it is understood that the multilayer sheet of the present invention exhibits excellent properties suitable as a container-forming material for content materials, such as food, for which degradation by oxidation and moisture permeation should be obviated. Moreover, the multilayer sheet provides an important advantage of little load to the environment at the disposal thereof, because it is formed of wholly biodegradable materials including the paper substrate.

The invention claimed is:

1. A multilayer sheet, comprising: a plant substrate sheet and a biodegradable resin layer laminated by melt-adhesion onto the plant substrate sheet, wherein said biodegradable resin layer comprises one or plural layers including at least a poly-glycolic acid resin layer, and the multilayer sheet includes on the substrate sheet a melt-adhesion layer comprising a polyglycolic acid resin or a biodegradable aromatic polyester resin exhibiting a melt viscosity of 10-5.0×10³ Pa·sec as measured at a temperature of 240° C. and a shear rate of 122 sec⁻¹ and having a melting point of at most 235° C.

2. A multilayer sheet according to claim 1, wherein the plant substrate sheet comprises at least one species selected from the group consisting of paper, natural polymer resin sheet and pulp mold sheet.

3. A multilayer sheet according to claim 1, wherein the bio-degradable resin layer has a laminate structure of a layer of biodegradable aromatic polyester resin forming the melt-adhesion layer proximate to the substrate sheet/polyglycolic acid resin layer/a layer of biodegradable resin other than polyglycolic acid resin.

4. A multilayer sheet according to claim 1, wherein the biodegradable resin layers include a layer of aliphatic polyester resin having a crystallization temperature of 120-190° C. which is disposed further proximate to the substrate sheet outside the melt-adhesion layer proximate to the substrate sheet.

5. A multilayer sheet according to claim 1, exhibiting an oxygen permeation constant of at most 5.0×10⁻¹⁴ cm³·cm/ cm²·sec·cmHg as measured at a temperature of 23° C. and 80% relative humidity.

6. A multilayer sheet according to claim 1, exhibiting a water vapor permeability of at most 25 g·20 μm/m²·day as measured at 40° C. and 90% relative humidity.

7. A multilayer sheet according to claim 1, formed by extrusion melt-lamination of the biodegradable resin layer onto the plant substrate sheet.

8. A multilayer sheet according to claim 1, formed by hot-pressure bonding lamination of the biodegradable resin layer onto the plant substrate sheet.

9. A food container comprising a multilayer sheet according to claim 1.

* * * * *

UNITED STATES PATENT AND TRADEMARK OFFICE
CERTIFICATE OF CORRECTION

| | | |
|---|---|---|
| PATENT NO. | : 7,785,682 B2 | Page 1 of 1 |
| APPLICATION NO. | : 11/630255 | |
| DATED | : August 31, 2010 | |
| INVENTOR(S) | : Takashi Sato et al. | |

It is certified that error appears in the above-identified patent and that said Letters Patent is hereby corrected as shown below:

On the face of the patent, Item [56] "Reference Cited" section, please insert the following under "Foreign Patent Documents":

--JP  04-336246  11/1992

JP  06-171050  06/1994

JP  06-255039  09/1994

JP  06-316042  11/1994

JP  11-091016  04/1999

JP  2000-238194  09/2000

JP  2003-261129  09/2003--

Signed and Sealed this
Eighth Day of February, 2011

David J. Kappos
*Director of the United States Patent and Trademark Office*